US007921163B1

(12) United States Patent  (10) Patent No.: US 7,921,163 B1
Odell et al.  (45) Date of Patent: Apr. 5, 2011

(54) ROUTING AND DISPLAYING MESSAGES FOR MULTIPLE CONCURRENT INSTANT MESSAGING SESSIONS INVOLVING A SINGLE ONLINE IDENTITY

(75) Inventors: James A. Odell, Potomac Falls, VA (US); Barry Appelman, McLean, VA (US)

(73) Assignee: AOL Inc., Dulles, VA (US)

( * ) Notice: Subject to any disclaimer, the term of this patent is extended or adjusted under 35 U.S.C. 154(b) by 1110 days.

(21) Appl. No.: 10/927,091

(22) Filed: Aug. 27, 2004

Related U.S. Application Data

(60) Provisional application No. 60/584,478, filed on Jul. 2, 2004.

(51) Int. Cl.
G06F 15/16 (2006.01)
(52) U.S. Cl. .................. 709/206; 709/227; 709/228
(58) Field of Classification Search .................. 709/206
See application file for complete search history.

(56) References Cited

U.S. PATENT DOCUMENTS

| | | | |
|---|---|---|---|
| 5,742,905 A * | 4/1998 | Pepe et al. ............... | 455/461 |
| 5,793,365 A | 8/1998 | Tang et al. | |
| 5,802,467 A | 9/1998 | Salazar et al. | |
| 5,828,312 A | 10/1998 | Yamazaki | |
| 5,872,521 A | 2/1999 | Lopatukin et al. | |
| 5,960,173 A | 9/1999 | Tang et al. | |
| 6,212,548 B1 * | 4/2001 | DeSimone et al. ........ | 709/204 |
| 6,260,148 B1 | 7/2001 | Aggarwal et al. | |
| 6,301,609 B1 | 10/2001 | Aravamudan et al. | |
| 6,324,492 B1 * | 11/2001 | Rowe ..................... | 703/13 |
| 6,346,952 B1 * | 2/2002 | Shtivelman ............. | 715/758 |
| 6,366,962 B1 | 4/2002 | Teibel | |
| 6,389,127 B1 | 5/2002 | Vardi et al. | |
| 6,405,035 B1 | 6/2002 | Singh | |
| 6,449,344 B1 | 9/2002 | Goldfinger et al. | |
| 6,453,294 B1 | 9/2002 | Dutta et al. | |
| 6,505,167 B1 | 1/2003 | Horvitz et al. | |

(Continued)

OTHER PUBLICATIONS

"Mac OS X in the Open: View topic—Adium History," [online], [retrieved on Dec. 14, 2004]. Retrieved from the Internet http://forums.cocaforge.com/viewtopic.php?t=168&highlight=history, (2 pages).

(Continued)

*Primary Examiner* — Krista M. Zele
*Assistant Examiner* — Tariq S Najee-Ullah
(74) *Attorney, Agent, or Firm* — Finnegan, Henderson, Farabow, Garrett & Dunner, LLP

(57) ABSTRACT

Routing and displaying instant messages includes receiving a first request to establish a first instant messaging session associated with an instant messaging online identity assigned to a user using a first instant messaging controller. The first instant messaging session is established in response to the first request, where the first instant messaging session includes a first state. A second request from the user is received to establish a second instant messaging session associated with the instant messaging online identity assigned to the user using a second instant messaging controller that differs from the first instant messaging controller. The second instant messaging session is established in response to the second request, where the second instant messaging session includes a second state. An instant message designated for the instant messaging online identity assigned to the user is received and a determination is made on where to route the instant message based on routing criteria. The routing criteria includes the first state of the first instant messaging session and the second state of the second instant messaging session. The instant message is routed based on the determination of where to route to the instant message.

45 Claims, 7 Drawing Sheets

U.S. PATENT DOCUMENTS

| Patent No. | | Date | Inventor(s) | Ref. |
|---|---|---|---|---|
| 6,519,639 | B1 | 2/2003 | Glasser et al. | |
| 6,539,421 | B1 | 3/2003 | Appelman et al. | |
| 6,549,937 | B1 | 4/2003 | Auerbach et al. | |
| 6,564,261 | B1* | 5/2003 | Gudjonsson et al. | 709/227 |
| 6,604,133 | B2 | 8/2003 | Aggarwal et al. | |
| 6,631,412 | B1 | 10/2003 | Glasser et al. | |
| 6,654,790 | B2 | 11/2003 | Ogle et al. | |
| 6,658,095 | B1 | 12/2003 | Yoakum et al. | |
| 6,668,167 | B2 | 12/2003 | McDowell et al. | |
| 6,677,968 | B1 | 1/2004 | Appelman | |
| 6,691,162 | B1 | 2/2004 | Wick | |
| 6,701,345 | B1 | 3/2004 | Carley et al. | |
| 6,714,519 | B2 | 3/2004 | Luzzatti et al. | |
| 6,714,793 | B1 | 3/2004 | Carey et al. | |
| 6,728,357 | B2 | 4/2004 | O'Neal et al. | |
| 6,750,881 | B1 | 6/2004 | Appelman | |
| 6,760,580 | B2 | 7/2004 | Robinson et al. | |
| 6,791,583 | B2 | 9/2004 | Tang et al. | |
| 6,807,562 | B1* | 10/2004 | Pennock et al. | 709/204 |
| 6,829,582 | B1 | 12/2004 | Barsness | |
| 6,865,268 | B1* | 3/2005 | Matthews et al. | 379/265.09 |
| 6,876,728 | B2 | 4/2005 | Kredo et al. | |
| 6,914,519 | B2 | 7/2005 | Beyda | |
| 7,016,978 | B2* | 3/2006 | Malik et al. | 709/246 |
| 7,127,685 | B2* | 10/2006 | Canfield et al. | 715/842 |
| 7,281,215 | B1* | 10/2007 | Canfield et al. | 715/752 |
| 7,328,242 | B1* | 2/2008 | McCarthy et al. | 709/204 |
| 7,356,567 | B2 | 4/2008 | Odell et al. | |
| 7,813,488 | B2* | 10/2010 | Kozdon et al. | 379/201.04 |
| 7,818,379 | B1* | 10/2010 | Heikes et al. | 709/206 |
| 2001/0013050 | A1 | 8/2001 | Shah | |
| 2001/0013069 | A1* | 8/2001 | Shah | 709/238 |
| 2001/0027474 | A1* | 10/2001 | Nachman et al. | 709/204 |
| 2001/0034224 | A1 | 10/2001 | McDowell et al. | |
| 2001/0034622 | A1 | 10/2001 | Davis | |
| 2002/0007398 | A1 | 1/2002 | Mendiola et al. | |
| 2002/0023131 | A1 | 2/2002 | Wu et al. | |
| 2002/0026483 | A1 | 2/2002 | Isaacs et al. | |
| 2002/0026520 | A1 | 2/2002 | Mendiola et al. | |
| 2002/0034281 | A1 | 3/2002 | Isaacs et al. | |
| 2002/0035605 | A1* | 3/2002 | McDowell et al. | 709/206 |
| 2002/0046299 | A1 | 4/2002 | Lefeber et al. | |
| 2002/0062345 | A1 | 5/2002 | Guedalia et al. | |
| 2002/0065894 | A1 | 5/2002 | Dalal et al. | |
| 2002/0087704 | A1 | 7/2002 | Chesnais et al. | |
| 2002/0116461 | A1 | 8/2002 | Diacakis et al. | |
| 2002/0116541 | A1 | 8/2002 | Parker et al. | |
| 2002/0120687 | A1 | 8/2002 | Diacakis et al. | |
| 2002/0120697 | A1 | 8/2002 | Generous et al. | |
| 2002/0129103 | A1* | 9/2002 | Birkler et al. | 709/203 |
| 2002/0130904 | A1 | 9/2002 | Becker et al. | |
| 2002/0178161 | A1 | 11/2002 | Brezin et al. | |
| 2003/0037103 | A1* | 2/2003 | Salmi et al. | 709/203 |
| 2003/0055977 | A1 | 3/2003 | Miller | |
| 2003/0088621 | A1 | 5/2003 | Martinez et al. | |
| 2003/0101343 | A1 | 5/2003 | Eaton et al. | |
| 2003/0158864 | A1 | 8/2003 | Samn | |
| 2003/0162561 | A1 | 8/2003 | Johnson et al. | |
| 2003/0167172 | A1 | 9/2003 | Johnson et al. | |
| 2003/0179230 | A1* | 9/2003 | Seidman | 345/750 |
| 2003/0208545 | A1 | 11/2003 | Eaton et al. | |
| 2003/0217109 | A1 | 11/2003 | Ordille et al. | |
| 2003/0229722 | A1 | 12/2003 | Beyda | |
| 2004/0019695 | A1 | 1/2004 | Fellenstein et al. | |
| 2004/0030750 | A1 | 2/2004 | Moore et al. | |
| 2004/0054737 | A1 | 3/2004 | Daniell | |
| 2004/0056893 | A1* | 3/2004 | Canfield et al. | 345/753 |
| 2004/0059781 | A1 | 3/2004 | Yoakum et al. | |
| 2004/0068567 | A1* | 4/2004 | Moran et al. | 709/227 |
| 2004/0073643 | A1 | 4/2004 | Hayes et al. | |
| 2004/0078445 | A1* | 4/2004 | Malik | 709/206 |
| 2004/0111479 | A1 | 6/2004 | Borden et al. | |
| 2004/0128353 | A1 | 7/2004 | Goodman et al. | |
| 2004/0128553 | A1 | 7/2004 | Buer et al. | |
| 2004/0148346 | A1* | 7/2004 | Weaver et al. | 709/204 |
| 2004/0158608 | A1* | 8/2004 | Friedman | 709/206 |
| 2004/0158609 | A1* | 8/2004 | Daniell et al. | 709/206 |
| 2004/0179039 | A1* | 9/2004 | Blattner et al. | 345/758 |
| 2004/0203695 | A1 | 10/2004 | Mikan | |
| 2004/0205775 | A1 | 10/2004 | Heikes et al. | |
| 2004/0223455 | A1* | 11/2004 | Fong et al. | 370/229 |
| 2004/0224772 | A1* | 11/2004 | Canessa et al. | 463/42 |
| 2004/0229604 | A1* | 11/2004 | Fong et al. | 455/422.1 |
| 2004/0260753 | A1* | 12/2004 | Regan | 709/200 |
| 2005/0066365 | A1* | 3/2005 | Rambo | 725/51 |
| 2005/0069099 | A1* | 3/2005 | Kozdon et al. | 379/88.13 |
| 2005/0071433 | A1* | 3/2005 | Shah | 709/207 |
| 2005/0102365 | A1 | 5/2005 | Moore et al. | |
| 2005/0149620 | A1* | 7/2005 | Kirkland et al. | 709/207 |
| 2005/0210394 | A1* | 9/2005 | Crandall et al. | 715/752 |
| 2006/0031292 | A1* | 2/2006 | Deshpande | 709/204 |
| 2006/0034430 | A1* | 2/2006 | Liakis | 379/67.1 |
| 2006/0059024 | A1* | 3/2006 | Bailey et al. | 705/5 |
| 2006/0059240 | A1 | 3/2006 | Qin et al. | |
| 2007/0162605 | A1* | 7/2007 | Chalasani et al. | 709/227 |

OTHER PUBLICATIONS

"Adium X: Version History," [online], [retrieved on Dec. 14, 2004]. Retrieved from the Internet http://www.adiumx.com/history.html, (12 pages).

"Gaim: The Pimpin' Penguin IM Client that's good for the soul!" [online], [retrieved on Dec. 14, 2004]. Retrieved from the Internet http://gaim.sourceforge.net/ChangeLog, (27 pages).

International Search Report, Application Serial No. PCT/US2004/06177, dated Jan. 31, 2005, 8 pages.

International Search Report, Application Serial No. PCT/US2005/47358, dated Feb. 9, 2007, 12 pages.

International Search Report, Application Serial No. PCT/US2005/47358, dated Jun. 13, 2007, 17 pages.

International Search Report, Application Serial No. PCT/US2006/39504, dated May 16, 2007, 17 pages.

Office Action, U.S. Appl. No. 11/025,849, dated Jan. 18, 2007, 17 pages.

Office Action, U.S. Appl. No. 11/025,849, dated May 1, 2007, 15 pages.

Notice of Allowance, U.S. Appl. No. 11/025,849, dated Oct. 16, 2007, 4 pages.

Office Action, U.S. Appl. No. 10/744,080, dated Aug. 20, 2007, 24 pages.

Office Action, U.S. Appl. No. 10/744,080, dated Feb. 12, 2008, 29 pages.

Office Action, U.S. Appl. No. 10/744,080, dated May 23, 2008, 28 pages.

Office Action, U.S. Appl. No. 10/744,080, dated Aug. 4, 2008, 32 pages.

Office Action, U.S. Appl. No. 10/744,080, dated Mar. 6, 2009, 36 pages.

* cited by examiner

300

| 310 | 320 |
| --- | --- |
| DEVICE | STATE |
| PC-Home | Active |
| Laptop | Idle |
| Cellular Phone | Away |

| | | 500 | | |
|---|---|---|---|---|
| 405 — Online Identity: AIM User | | | | |
| 410 — DEVICE | Instant Messages | SMS Messages | Emails | 425, 430, 435 |
| 550 PC-Home | | | | |
| 555 — Family | ○ | ○ | ○ | |
| 560 — Work | ○ | ○ | ○ | |
| Buddies | ○ | ○ | ○ | |
| Laptop | | | | |
| Family | ○ | ○ | ○ | |
| Work | ○ | ○ | ○ | |
| Buddies | ○ | ○ | ○ | |
| Cellular Phone | | | | |
| Family | ○ | ○ | ○ | |
| Work | ○ | ○ | ○ | |
| Buddies | ○ | ○ | ○ | |

ROUTING AND DISPLAYING MESSAGES FOR MULTIPLE CONCURRENT INSTANT MESSAGING SESSIONS INVOLVING A SINGLE ONLINE IDENTITY

CROSS REFERENCE TO RELATED APPLICATIONS

This application claims priority from U.S. Provisional Application No. 60/584,478, filed Jul. 2, 2004, and titled "Routing and Displaying Messages for Multiple Concurrent Instant Messaging Sessions Involving a Single Online Identity," which is incorporated by reference.

TECHNICAL FIELD

This document relates to techniques for routing and displaying messages for multiple concurrent instant messaging sessions involving a single online identity.

BACKGROUND

Instant messaging is one manner in which people may communicate with other people. A user may be able access an instant messaging online identity multiple times from multiple different devices. For example, the user may be logged into the user's instant messaging online identity through an instant messaging application on the user's desktop personal computer at home. At the same time, the user may be logged into the same instant messaging online identity through an instant messaging application on the user's personal digital assistant. An instant message routing and displaying scheme is desirable to address those situations when the user is logged into the same instant messaging online identity multiple times, potentially from multiple different devices.

SUMMARY

In one general aspect, routing and displaying instant messages includes receiving a first request to establish a first instant messaging session associated with an instant messaging online identity assigned to a user using a first instant messaging controller. The first instant messaging session is established in response to the first request, where the first instant messaging session includes a first state. A second request from the user is received to establish a second instant messaging session associated with the instant messaging online identity assigned to the user using a second instant messaging controller that differs from the first instant messaging controller. The second instant messaging session is established in response to the second request, where the second instant messaging session includes a second state. An instant message designated for the instant messaging online identity assigned to the user is received and a determination is made on where to route the instant message based on routing criteria. The routing criteria includes the first state of the first instant messaging session and the second state of the second instant messaging session. The instant message is routed based on the determination of where to route to the instant message.

Implementations may include one or more of the following features. For example, the first state and the second state may include a user-defined state. The first state and the second state may include an active state. The first state and the second state may include an idle state. The first state and the second state may include a user-set state. The user-set state may include an away state.

The instant message may be displayed using the instant messaging controller to where the instant message was routed.

The first instant messaging controller may include a computer program running on a personal computer and the second instant messaging controller may include a computer program running on a mobile device. The mobile device may include a cellular phone. The mobile device may include a personal digital assistant.

The first instant messaging controller and the second instant messaging controller may include the computer programs running on different mobile devices. The mobile devices may include at least one cellular phone. The mobile devices may include at least one personal digital assistant.

The first instant messaging controller and the second instant messaging controller may include computer programs running on different personal computers.

The routing criteria may include a type of device that the first instant messaging controller and the second instant messaging controller are running on. Determining where to route the instant message may include identifying a subset of less than all of the instant messaging sessions.

These general and specific aspects may be implemented using a system, a method, or a computer program, or any combination of systems, methods, and computer programs.

Other features will be apparent from the description and drawings, and from the claims.

DESCRIPTION OF DRAWINGS

FIG. 3 is an exemplary table indicating a state of multiple concurrent instant messaging sessions per device.

FIGS. 4 and 5 are exemplary graphical user interfaces (GUIs) for enabling an online identity to select message routing criteria.

Like reference symbols in the various drawings may indicate like elements.

DETAILED DESCRIPTION

Figure 1:
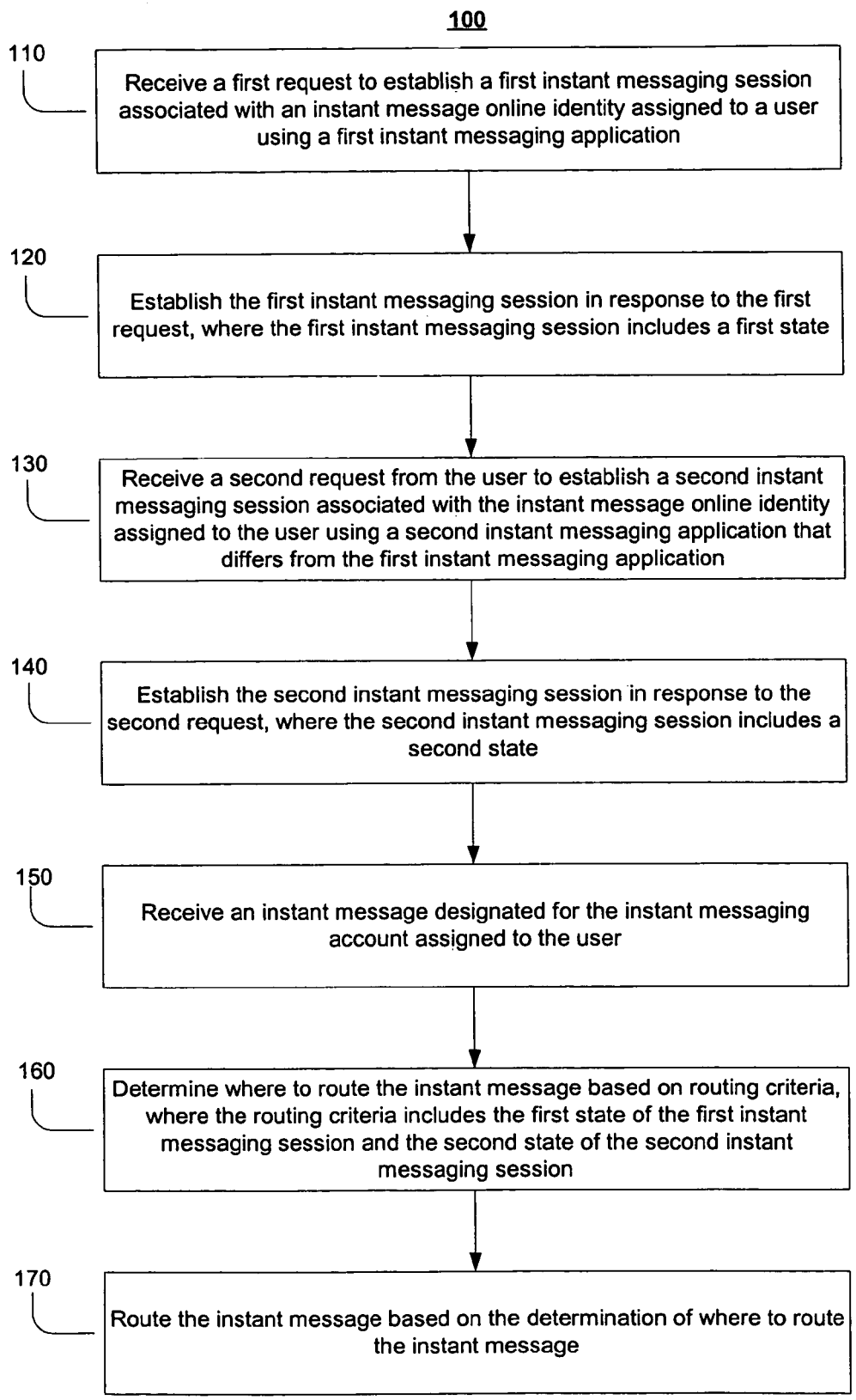
FIG. 1 is a flow chart of an exemplary process for routing messages for multiple concurrent instant messaging sessions involving a single online identity.

In general, a user may have multiple, simultaneous instant messaging sessions that are associated with a user's single instant messaging account or identity. The user may conduct the multiple, concurrent instant messaging sessions using multiple instant messaging controllers (e.g., software applications). For example, a user may establish an instant messaging session associated with the user's instant messaging online identity using an instant messaging controller on a personal computer. Concurrently, the user may establish another instant messaging session associated with the user's instant messaging online identity using an instant messaging controller on a mobile device. Thus, the user may log into the same instant messaging online identity multiple times to establish multiple instant messaging sessions using different instant messaging controllers on different devices. With the establishment of each instant messaging session, the user's Buddy List may be accessed and presented to the user, such that the user receives an indication of which buddies are online. The user may communicate using instant messages with the buddies from each of the different devices.

In this example, when an instant message is sent to the user, routing criteria is used to determine where to route the incoming instant message. In one exemplary implementation, the routing criteria includes the state of the different instant messaging sessions. For instance, if both instant messaging sessions described above are active, then the instant message may be routed to both instant messaging controllers on the different devices. If, however, the instant messaging session on the mobile device is active and the instant messaging session on the personal computer is idle, then the instant message may be routed only to the instant messaging controller on the mobile device. In this particular instance, by not routing the incoming instant message to the idle instant messaging session, which in this case is on the personal computer, the user's privacy is protected because the instant message is not routed to and will not be displayed by the device with the idle state. For example, the user may no longer be operating the instant messaging session running on the personal computer (e.g., physically relocated from the location of the personal computer) and is now only communicating using the instant messaging session on the mobile device. The state of the instant messaging session may be established by the user or it may be set based on other predefined criteria (e.g., lack of manipulation of the personal computer or mobile device may be used to infer idle state).

In another exemplary implementation, the routing criteria includes the state of the instant messaging sessions and a type of device used to establish the instant messaging session. In the example provided above, for instance, if the user sets a forwarding preference on the personal computer to forward instant messages to the wireless device when the personal computer is idle, then the instant message is routed based on an active instant message session on the instant messaging controller on the wireless device and the idle state on the personal computer.

FIG. 1 illustrates an exemplary process 100 for routing instant messages when there are multiple, concurrent instant messaging sessions using the same instant messaging online identity. A first request is received to establish a first instant messaging session associated with an instant message online identity assigned to a user using a first instant messaging controller (step 110). In response to the first request, the first instant messaging session is established. The first instant messaging session is associated with a first state (step 120). A second request is received from the user to establish a second instant messaging session associated with the instant messaging online identity assigned to the user using a second instant messaging controller that differs from the first instant messaging controller (step 130). In response to the second request, the second instant messaging session is established. The second instant messaging session is associated with a second state (step 140).

When an instant message is received that is designated for the instant messaging online identity assigned to the user (step 150), a determination is made of where to route the instant message based on routing criteria. The routing criteria includes the state of the first instant messaging session and the state of the second instant messaging session (step 160). The instant message is routed based on the determination of where to route the instant message (step 170).

The user may request to establish an instant messaging session associated with an instant messaging online identity using an instant messaging controller (steps 110 and 130). References to the user request to establish an instant messaging session include user initiated actions on a device having an instant messaging controller and any automated request that an instant messaging controller on a device may initiate to establish an instant messaging session. Thus, the request to establish an instant messaging does not necessarily require a literal request from the user but instead may be, for example, the automatic launch of an instant messaging controller as part of the start-up sequence for a device.

Typically, a user is associated with an instant messaging online identity. The instant messaging online identity may be maintained at a remote location by an instant messaging service provider. In one implementation, a user may subscribe to an instant messaging online identity with a commercial instant messaging service provider, such as those provided by America Online, Inc., Yahoo, Inc., Microsoft, Inc., and other instant messaging service providers. In another implementation, a user may be a part of an enterprise instant messaging service and may have an instant messaging online identity as part of the enterprise system. In some cases, the instant messaging online identity may be part of both a commercially available instant message service provider and an enterprise instant message provider. In another implementation, the user may have an instant messaging online identity in a point-to-point ("P2P") instant messaging system.

The instant messaging online identity may be accessed by the user through the use of the online identity and a password. For example, the online identity may include a set of alphanumeric characters, symbols, tokens, or other types of online identities. In one implementation, a screen name may be used as the online identity. The instant messaging online identity typically includes information related to the user such as a user's profile. The user's profile may include the user's preferences and a user-defined list of other co-users or co-subscribers, which may be called a user's buddy list.

In general, a user's buddy list may be maintained with or accessible as part of a user's profile and may be made accessible using a user interface (UI) that provides the online status and capabilities of certain screen names, i.e., "buddies," identified by the user. In particular, the instant message service provider may inform the user whether or not identified buddies are online, i.e., currently accessing the instant messaging service provider, enterprise host, or PTP node, as the case may be. The instant message service provider also informs any other user who has identified the user as a buddy that the user is currently online.

An instant messaging session includes a time from when a user requests and establishes the instant messaging session until the user logs off or is otherwise disconnected from the instant messaging session. A single instant messaging session may include one or more separate instant message exchanges with one or more buddies. An instant message may include a text or non-text (e.g., audio, video) instant message.

In one implementation, one aspect of establishing the instant messaging session (steps 120 and 140) includes notifying the user of his buddies that are online and notifying other users, who list the user as a buddy, that the user is online. When the first instant messaging session is established (step 120), the other users may be notified that the user is online. When the second instant messaging session is established (step 140), the other users may not be re-notified that the user is online because the second instant messaging session is associated with the same instant messaging online identity as the first instant messaging session.

An instant messaging session may be established using an instant messaging controller and a device. An example of a device is a general-purpose computer capable of responding to and executing instructions in a defined manner. Other examples include a special-purpose computer, a personal computer ("PC"), a workstation, a server, a laptop, a cellular communications device, a Web-enabled telephone, a personal digital assistant ("PDA"), a Web-enabled PDA, an interactive television set, a settop box, a video tape recorder ("VTR"), a DVD player, an on-board (i.e., vehicle-mounted) computer, or any other component, machine, tool, equipment, or some combination thereof capable of responding to and executing instructions.

An example of a controller, including an instant messaging controller, is a software application (e.g., operating system, browser application, microbrowser application, server application, proxy application, gateway application, tunneling application, e-mail application, instant messaging client, online service provider client application, interactive television client application, and/or Internet service provider client) loaded on a device to command and direct communications enabled by the device. Other examples include a computer program, a piece of code, an applet, a Java applet, a script, an instruction, another device, or some combination thereof, for independently or collectively instructing the device to interact and operate as desired. The controller may be embodied permanently or temporarily in any type of machine, component, physical or virtual equipment, storage medium, or propagated signal capable of providing instructions to a device. In particular, the controller (e.g., software application, computer program) may be stored on a storage media or device (e.g., ROM, magnetic diskette, or propagated signal) readable by a general or special purpose programmable computer, such that if the storage media or device is read by a computer system, the functions described herein are performed.

A buddy list may be used to facilitate instant messaging communications between users. For example, a user can activate an instant messaging user interface that is pre-addressed to a buddy simply by selecting the screen name of an online buddy from the buddy list.

Alternatively, by way of example, if a recipient is not a "buddy," the first user generally initiates instant messaging communications by activating a blank instant messaging user interface and then addressing that interface to the online identity (e.g., screen name) of the intended recipient. When necessary, a user may look up the screen name of an intended recipient using the intended recipient's e-mail address or other means.

In response to receiving a request from the user to establish an instant messaging session (steps 110 and 130), the instant messaging session is established and is associated with a state (steps 120 and 140). The instant messaging session may derive its state from the state of the instant messaging controller, the state of the device that the instant messaging controller is running on, or a combination of the state of the instant messaging controller and the state of the device.

The instant messaging session may include a user-set state or a nonuser-set state, which may include aspects that are configurable by the user. For example, a nonuser-set state for an instant messaging session may include an active state. The active state is an indication that the user is or has recently been active within the instant messaging controller and/or the device that the instant messaging controller is running on. The active state includes when a user has established an instant messaging session and has been active in the instant messaging controller, the device or a combination of the instant messaging controller or the device within a configurable period of time. In one implementation, a user is considered to be active on the device when the user is using or has recently used within a configurable period of time an input device, such as, for instance, a mouse, a keyboard, a keypad, a touch-pad, a touch screen, a stylus, or a voice-input mechanism. A user may be consider to be active when a movement of the device is detected or has been recently detected within a configurable period of time by a motion sensor that is included as part of the device. A user may be considered active in the instant messaging controller when the user is performing or has recently performed an action within the instant messaging controller. In one implementation, the user may be active on the device and not active in the instant messaging controller. If the active state is based only on activity of the instant messaging controller, then the instant messaging session would be in an inactive state.

Another example of a nonuser-set state for an instant messaging session may include an idle state. The idle state includes when a user has established an instant messaging session but has not been active in one or more of the instant messaging controller, the device, or a combination of the instant messaging controller or the device within a configurable period of time. In one implementation, if the state of the instant messaging session is based only on the state of the instant messaging controller, then it is possible for the session to be idle when the user is active on the device.

One example of a user-set state includes an away state. The away state may function similar to the idle state, except that the user sets the away state.

Other users who list the user as a buddy on their buddy lists may perceive the state of the user's instant messaging session. Furthermore, the user-set states and the non-user states may include providing information to other users to indicate that the user is not available. The information may be provided automatically in response to another user sending the user an instant message. The user may use default notifications or may customize notifications that are provided to the other users. For example, a user who attempts to communicate with another user who is in an idle or an away state may receive a notification that the user is idle or away.

Another example of a user-set state is a forwarding state. In one implementation, the forwarding state enables instant messages to be forwarded to another device. Specifically, for example, the forwarding state may include forwarding received instant messages to another device that is in an active state, such as a wireless or a mobile device, when one device is in an idle or away state.

After the user establishes an instant messaging session (steps 120 and 140), instant messages may be received for the user (step 150). A determination may be made as to where to route received instant messages based on routing criteria (step 160). In one exemplary implementation, the routing criteria includes the states of the established instant messaging sessions.

In one implementation, instant messages sent to the user are routed through an intermediary, such as, for example, an instant messaging server. The instant message server may include a collection of one or more related servers that perform one or more instant messaging functions, including tracking users who have established one or more instant messaging sessions with their instant messaging online identity. The instant messaging server may make the determination on where to route received instant messages based on the routing criteria (step 160).

Once the determination is made of where to route an incoming instant message, the instant message is routed based on the determination (step 170). In one implementation, the instant message is routed to one or more instant messaging controllers that are associated with respective instant messaging sessions. The routed instant message may be made visually and/or audibly perceptible to the user on the device that is running the instant messaging application.

Figure 2:
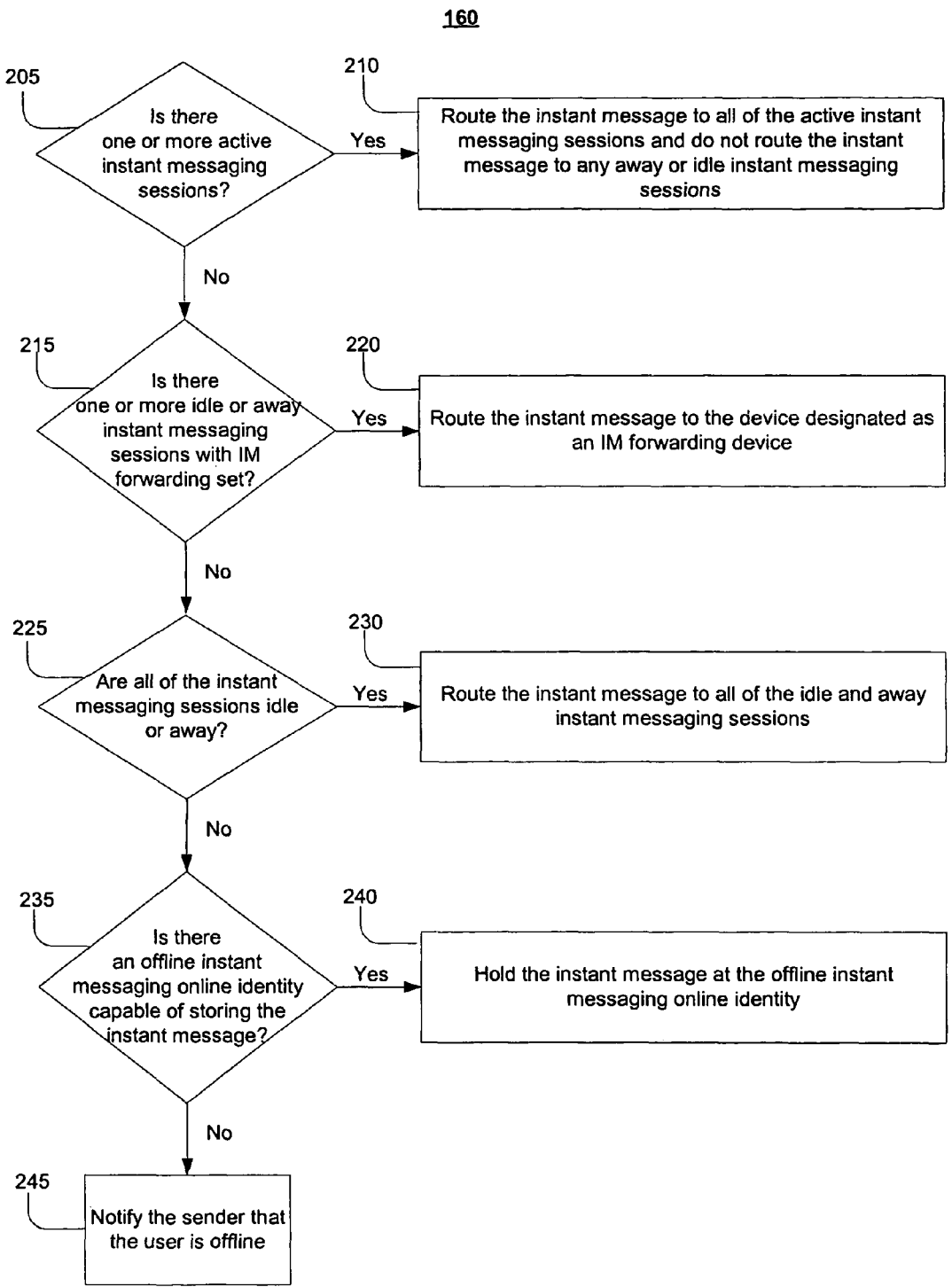
FIG. 2 is a flow chart of an exemplary process for determining where to route an incoming instant message based on routing criteria.

FIG. 2 illustrates an exemplary process 160 for determining where to route an incoming instant message based on routing criteria, where the routing criteria includes the states of the established instant messaging sessions. It should be understood that process 160 is provided as merely one exemplary determination routing scheme and that other determination routing schemes also are contemplated by this disclosure.

If there is one or more active instant messaging sessions (step 205), the incoming instant messages are routed to all of the active instant messaging sessions and the instant message is not routed to any away or idle instant messaging sessions (step 210). By routing incoming instant messages to only the active instant messaging sessions and not to any idle or away instant messaging sessions, the user's privacy is protected. For instance, the user may have established an instant messaging session using an instant messaging controller at home on a personal computer. The user also may have established an instant messaging session using an instant messaging controller on a mobile device. If the user leaves home and does not end the established instant messaging session on the personal computer, the instant messaging session will eventually go into an idle state. While the instant messaging session on the personal computer is in an idle state and the instant messaging session on the mobile device is in an active state, the instant messages are not routed to the personal computer and are only routed to the instant messaging controller on the mobile device.

If one or more are in idle or away states instant messaging sessions and an instant messaging forwarding state has been set (step 215), then the instant message is routed to the device designated as the instant messaging forwarding device (step 220). The instant messaging forward state routes the instant message to a designated device. For example, the device may include a mobile or a wireless device that is capable of receiving instant messages as a text message even when an no instant messaging controller is running on the device. Thus, with the instant messaging forward set, the instant message may be routed to a particular device as a text message.

If all of the established instant messaging sessions are idle or away (step 225), then the instant message is routed to one, more, or all of the idle and away instant messaging sessions (step 230). For example, in one implementation, routing incoming instant messages to all of the idle and away instant messaging sessions ensures that the user does not miss and incoming instant message. Since no instant messaging sessions are active in this situation, one cannot be sure where the user might be available to receive the instant message.

If the user's instant messaging online identity is able to store incoming instant messages for routing at a future time (step 235), then incoming instant messages are simply held at the instant messaging online identity for routing at some future time (step 240). Otherwise, the sender of the incoming instant message is notified that the user is offline (step 245).

Referring to FIG. 3, an exemplary table 300 illustrates a table that may be maintained to track the established, multiple concurrent instant messaging sessions for an online identity on a per device basis. Table 300 may be tracked by the intermediary, such as, for example, the instant messaging server described above. An online identity's established instant messaging sessions may be tracked by device 310 and by the state of the instant messaging session 320. In exemplary table 300, the online identity has established three instant messaging sessions: an instant messaging session on the online identity's home personal computer, designated in the table as "PC-Home"; an instant messaging session on the online identity's laptop computer, designated in the table as "Laptop"; and an instant messaging session on the online identity's cellular phone, designated in the table as "Cellular Phone."

Alternatively, table 300 may track the established instant messaging session using information in addition to or other than a device name. For example, table 300 may be used to track the established instant messaging session by an address of the device, such as, the Internet Protocol (IP) address the device used to establish the instant messaging session.

Table 300 reflects the current state of the instant messaging session 320 for each device 310 for the online identity. Table 300 may be used (e.g., by the instant messaging server) to make the determination on where to route the received instant messages based on the routing criteria (e.g., the state of the instant messaging session per device) (see step 160). In exemplary table 300, the state of the instant messaging session for the session designated as "PC-Home" is "Active," the state of the instant messaging session for the session designated as "Laptop" is "Idle," and the state of the instant messaging session for the session designated as "Cellular Phone" is "Away."

Figure 4:
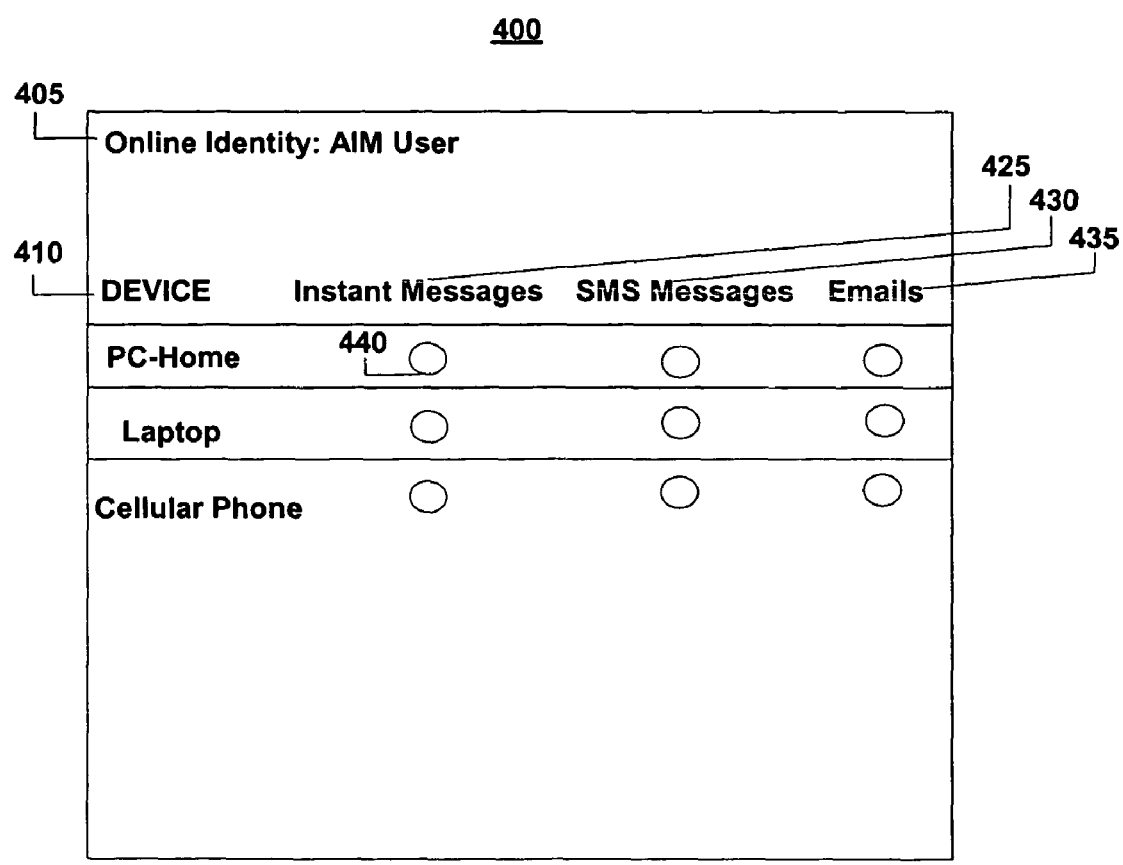

In one exemplary implementation, the user may establish the routing criteria for messages by device and message type. Referring to FIG. 4, the user may be presented with a graphical user interface (GUI), such as, for example, GUI 400. Exemplary GUI 400 may be presented to the user to enable the user (e.g., online identity "AIM User" 405) to direct the type of message that should be routed to each specific device 410. GUI 400 may be accessible from an instant messaging controller available on any one of the devices 410 for the online identity 405. Selections made in GUI 400 from one instant messaging controller may be saved in a corresponding inclusion list maintained at a remote location, such as, for example, at the instant messaging server.

Exemplary message types include instant messages 425, short message service (SMS) messages 430, and emails 435. The online identity 405 may select which message types should be routed to a specific device 410 using selection bubbles 440. In one exemplary implementation, the user-selected routing criteria may take precedence over routing criteria based on the state of an instant messaging session. For instance, if the online identity affirmatively selects that instant messages 425 should be routed to the cellular phone device, then instant messages will be routed to the cellular phone even if cellular phone is in an idle or away state. In another exemplary implementation, the user-selected routing criteria may work in tandem with the routing criteria based on the state of the instant messaging session.

Alternatively, in another exemplary implementation, GUI 400 may be arranged to operate as an exclusion list by enabling the online identity 405 to select the device 410 and the type of messages that the online identity 405 does not want routed to a specific device or specific devices. For instance, if the online identity affirmatively selects that instant messages 425 should not be routed to the cellular phone device, then instant messages will not be routed to the cellular phone even if the cellular phone is in an active state. Selections made in GUI 400 from one instant messaging controller may be saved in a corresponding exclusion list maintained at a remote location, such as, for example, at the instant messaging server.

In another exemplary implementation, the user may establish routing criteria for messages by device, message type, and by sender category. Referring to FIG. 5, GUI 500 illustrates that the online identity 405 may direct the routing of specific messages (e.g., instant messages 425, SMS messages 430, and emails 435) to specific devices 410 by sender category. In one implementation, the sender categories may correspond to the online identity's grouping of buddies in their Buddy List. For instance, the online identity may group their buddies into groups called "Family" 550, "Work" 555, and "Buddies" 560. GUI 500 may present these user-defined buddy groups to the online identity 405 so that the identity can select to which device 410 specific types of messages should be routed based on the buddy group that the sender belongs.

As discussed above with respect to GUI 400 of FIG. 4, GUI 500 may correspond to either an inclusion list or an exclusion list and the corresponding list may be maintained at a remote location, such as, for example, at the instant messaging server for use in determining where to route incoming messages. In one exemplary implementation, GUI 500 may be presented with even more granularity to the online identity by presenting a list of the identity's buddies and enabling the identity to select message routing based on the specific buddy that sent the incoming message.

Figure 6:
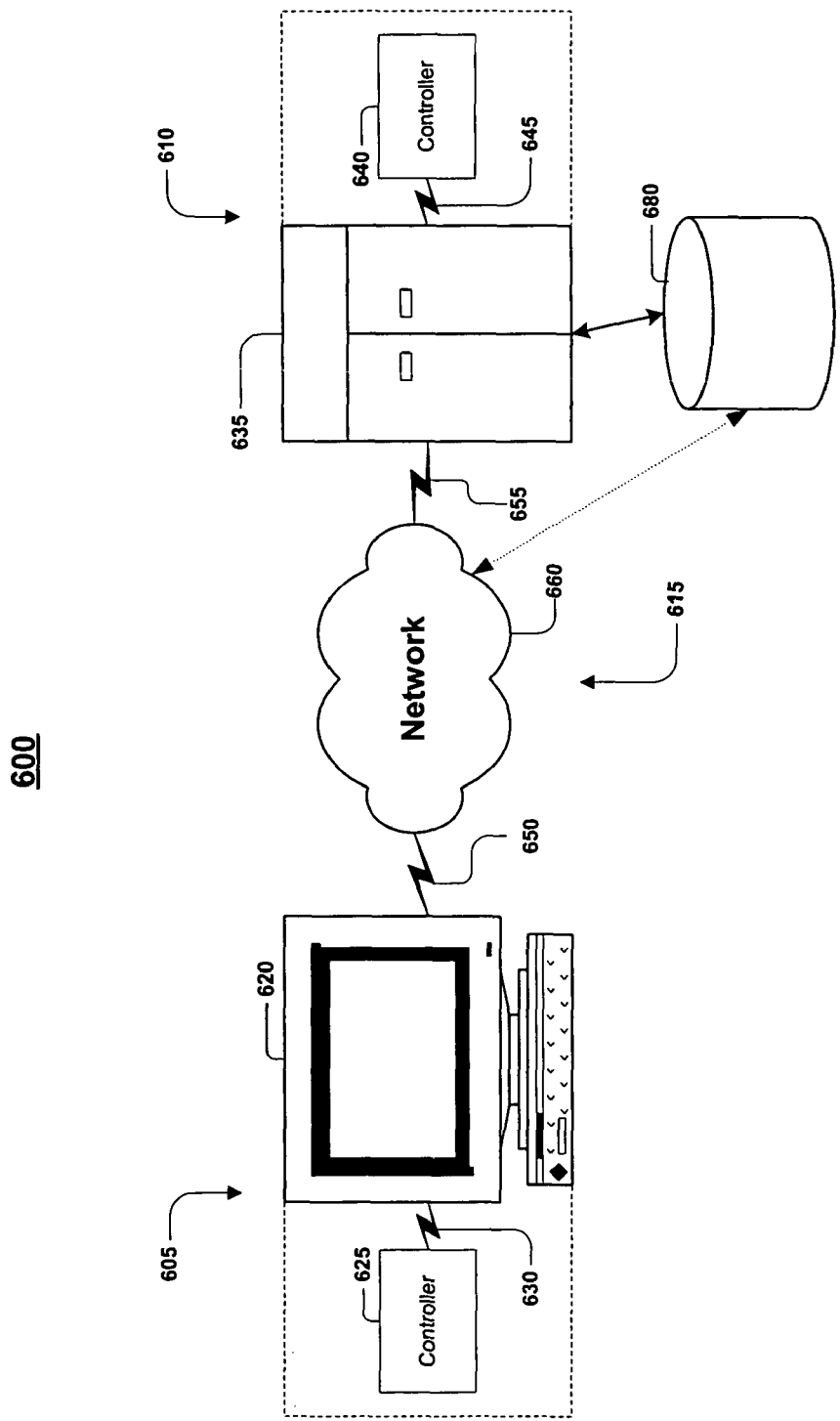
FIG. 6 is a block diagram of a communications system.
Figure 7:
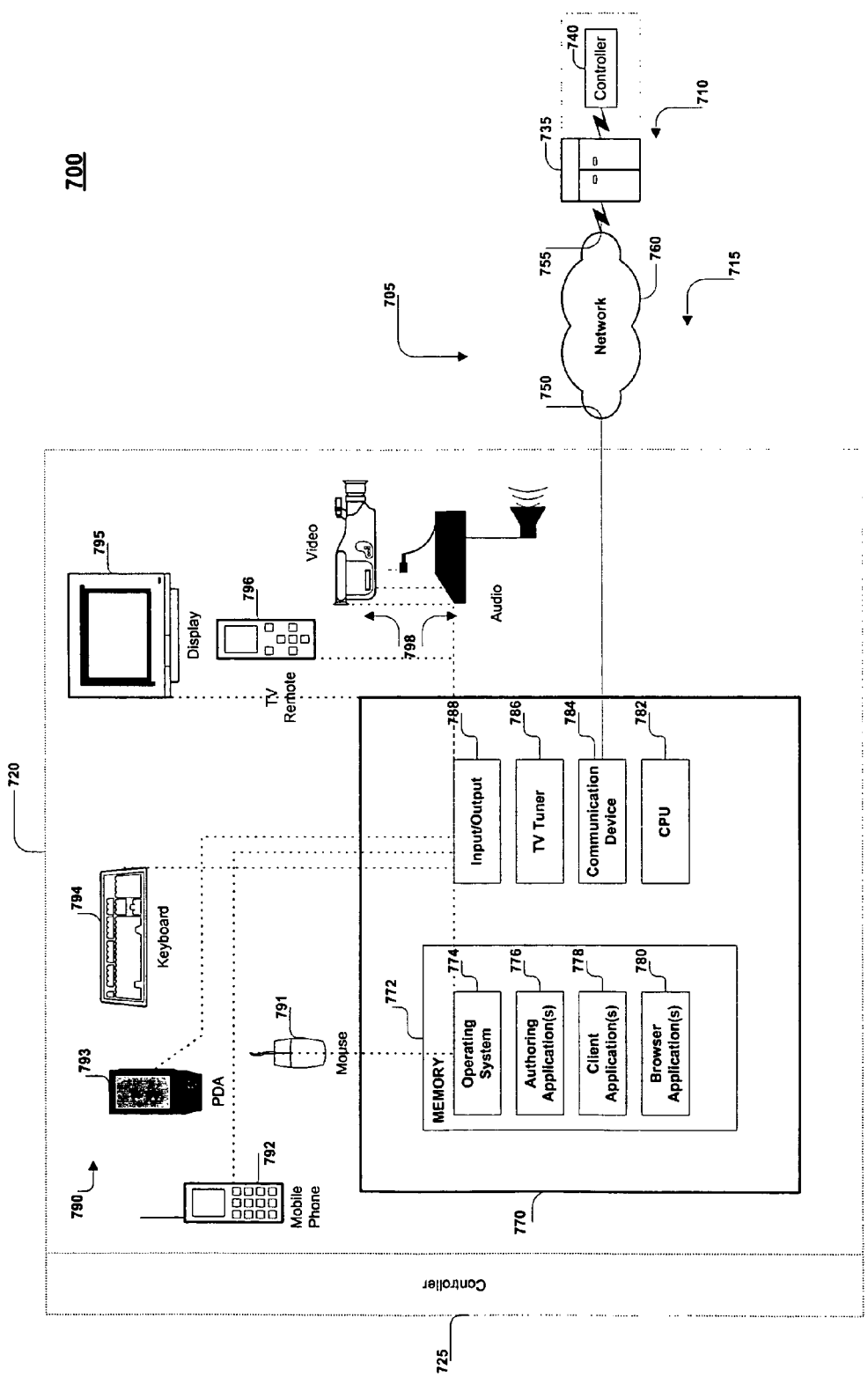
FIG. 7 is an expansion of the block diagram of FIG. 6.

FIGS. 6 and 7 illustrate an exemplary block diagram 600 and 700 of a communications system that may be used as part of the implementation of the features described above.

For illustrative purposes, FIGS. 6 and 7 show an example of a communications system for implementing techniques for transferring electronic data, including instant messages. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 6, a communications system 600 is capable of delivering and exchanging data between a user system 605 and a provider system 610 through a communications link 615. The user system 605 may include a client system and the provider system 610 may include a host system. The user system 605 typically includes one or more user devices 620 and/or user controllers 625, and the provider system 610 typically includes one or more provider devices 635 and/or provider controllers 640. For example, the user system 605 or the provider system 610 may include one or more general-purpose computers (e.g., personal computers), one or more special-purpose computers (e.g., devices specifically programmed to communicate with each other and/or the user system 605 or the provider system 610), or a combination of one or more general-purpose computers and one or more special-purpose computers. The user system 605 and the provider system 610 may be arranged to operate within or in concert with one or more other systems, such as, for example, one or more Local Area Networks ("LANs") and/or one or more Wide Area Networks ("WANs").

The provider system 610 may include a communication interface such as an electronic mail gateway. For instance, the provider system 610 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 610 enables communications between the provider system 610 and other systems through, for example, communications link 615.

The user device 620 (or the provider device 635) is generally capable of executing instructions under the command of a user controller 625 (or a provider controller 640). The user device 620 (or the provider device 635) is connected to the user controller 625 (or the provider controller 640) by a wired or wireless data pathway 630 or 645 capable of delivering data.

The user device 620, the user controller 625, the provider device 635, and the provider controller 640 each typically include one or more hardware components and/or software components. An example of a user device 620 or a provider device 635 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The user device 620 and the provider device 635 may include devices that are capable of peer-to-peer communications.

An example of a user controller 625 or a provider controller 640 is a software application loaded on the user device 620 or the provider device 635 for commanding and directing communications enabled by the user device 620 or the provider device 635. Other examples include a program, a piece of code, an instruction, a device, a computer, a computer system, or a combination thereof, for independently or collectively instructing the user device 620 or the provider device 635 to interact and operate as described. The user controller 625 and the provider controller 640 may be embodied permanently or temporarily in any type of machine, component, physical or virtual equipment, storage medium, or propagated signal capable of providing instructions to the user device 620 or the provider device 635.

The communications link 615 typically includes a delivery network 660 making a direct or indirect communication between the user system 605 and the provider system 610, irrespective of physical separation. Examples of a delivery network 660 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 615 may include communication pathways 650 and 655 that enable communications through the one or more delivery networks 660 described above. Each of the communication pathways 650 and 655 may include, for example, a wired, wireless, cable or satellite communication pathway.

An electronic information store 680 may be connected to the provider system 610, included as a component of the provider system 610, and/or connected to the delivery network 660. The electronic information store 680 may be a repository for electronic information that may be in an indexed and/or searchable format. For example, in one implementation, the electronic information store 680 may be used to store information related to instant messaging online identities.

FIG. 7 illustrates a communications system 700 including a user system 705 communicating with a provider system 710 through a communications link 715. User system 705 typically includes one or more user devices 720 and one or more user controllers 725 for controlling the user devices 720. Provider system 710 typically includes one or more provider devices 735 and one or more provider controllers 740 for controlling the provider devices 735. The communications link 715 may include communication pathways 750 and 755 that enable communications through the one or more delivery networks 760.

Examples of each element within the communications system of FIG. 7 are broadly described above with respect to FIG. 6. In particular, the provider system 710 and communications link 715 typically have attributes comparable to those described with respect to the provider system 610 and the communications link 615 of FIG. 6. Likewise, the user system 705 of FIG. 7 typically has attributes comparable to and illustrates one possible implementation of the user system 605 of FIG. 6.

The user device 720 typically includes a general-purpose computer 770 having an internal or external storage 772 for storing data and programs such as an operating system 774 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 776 (e.g., word processing programs, database programs, spreadsheet programs, or graphics programs) capable of generating documents or other electronic content; client applications 778 (e.g., stand alone e-mail client or AOL client, CompuServe client, AIM client, AOL TV client, or ISP client, all of which may include a built-in or embedded e-mail or instant messaging client) capable of communicating with other computer users, accessing various computer resources, and viewing, creating, or otherwise manipulating electronic content; and browser applications 780 (e.g., Netscape's Navigator or Microsoft's Internet Explorer) capable of rendering standard Internet content and also capable of supporting a web-based e-mail client and a web-based instant messaging client.

The general-purpose computer 770 also includes a central processing unit 782 (CPU) for executing instructions in response to commands from the user controller 725. In one implementation, the user controller 725 includes one or more of the application programs installed on the internal or external storage 772 of the general-purpose computer 770. In another implementation, the user controller 725 includes application programs stored in and performed by one or more device(s) external to the general-purpose computer 770.

The general-purpose computer also includes a communication device 784 for sending and receiving data. One example of the communication device 784 is a modem. Other examples include a transceiver, a set-top box, a communication card, a satellite dish, an antenna, or another network adapter capable of transmitting and receiving data over the communications link 715 through a wired or wireless data pathway 750. The general-purpose computer 770 also may include a TV tuner 786 for receiving television programming in the form of broadcast, satellite, and/or cable TV signals. As a result, the user device 720 can selectively and/or simultaneously display network content received by communications device 784 and television programming content received by the TV tuner 786.

The general-purpose computer 770 typically includes an input/output interface 788 for wired or wireless connection to various peripheral devices 790. Examples of peripheral devices 790 include, but are not limited to, a mouse 791, a mobile phone 792, a personal digital assistant 793 (PDA), a MP3 player (not shown), a keyboard 794, a display monitor 795 with or without a touch screen input, a TV remote control 796 for receiving information from and rendering information to subscribers, and an audiovisual input device 798.

Although FIG. 7 illustrates devices such as a mobile telephone 792, a PDA 793, and a TV remote control 796 as being peripheral with respect to the general-purpose computer 770, in another implementation, such devices may themselves include the functionality of the general-purpose computer 770 and operate as the user device 720. For example, the mobile phone 792 or the PDA 793 may include computing and networking capabilities and function as a user device 720 by accessing the delivery network 760 and communicating with the provider system 710. Furthermore, the user system 705 may include one, some or all of the components and devices described above.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for routing instant messages, the method comprising:

receiving, from a first instant messaging controller computer program running on a first personal computer, a first request for an instant messaging online identity assigned to a user to be logged on to an instant messaging system through the first personal computer, wherein the instant messaging system is configured with at least one processor;

in response to receiving the first request for the instant messaging online identity to be logged on to the instant messaging system through the first personal computer, logging the instant messaging online identity on to the instant messaging system through the first personal computer such that the instant messaging online identity is enabled to send and receive instant messages using the first instant messaging controller computer program running on the first personal computer, wherein the first instant messaging controller computer program monitors a status of the instant messaging online identity at the first personal computer while the instant messaging online identity is logged on to the instant messaging system through the first personal computer;

while the instant messaging online identity remains logged on to the instant messaging system through the first personal computer, receiving, from a second instant messaging controller computer program running on a second personal computer, a second request for the same instant messaging online identity to be logged on to the instant messaging system through the second personal computer, wherein the second instant messaging controller computer program differs from the first instant messaging controller computer program and the second personal computer differs from the first personal computer;

in response to receiving the second request for the instant messaging online identity to be logged on to the instant messaging system through the second personal computer, logging the instant messaging online identity on to the instant messaging system through the second personal computer such that the instant messaging online identity is enabled to send and receive instant messages using the second instant messaging controller computer program running on the second personal computer and such that the instant messaging online identity is logged on to the instant messaging system at both the first personal computer and the second personal computer concurrently, wherein the second instant messaging controller computer program monitors a status of the instant messaging online identity at the second personal computer while the instant messaging online identity is logged on to the instant messaging system through the second personal computer;

while the instant messaging online identity remains concurrently logged on to the instant messaging system through both the first personal computer and the second personal computer, using the at least one processor for:
- receiving a first instant message addressed to the instant messaging online identity,
- in response to receiving the first instant message addressed to the instant messaging online identity, determining a first state of the status of the instant messaging online identity at the first personal computer and a first state of the status of the instant messaging online identity at the second personal computer,
- based on the determined first state of the status of the instant messaging online identity at the first personal computer and the determined first state of the status of the instant messaging online identity at the second personal computer, determining to route the first instant message to both the first personal computer and the second personal computer,
- as a consequence of having determined to route the first instant message to both the first personal computer and the second personal computer, routing the first instant message to both the first personal computer and the second personal computer;

while the instant messaging online identity remains concurrently logged on to the instant messaging system through both the first personal computer and the second personal computer and after routing the first instant message to both the first personal computer and the second personal computer, using the at least one processor for:
- receiving a second instant message addressed to the instant messaging online identity;
- in response to receiving the second instant message addressed to the instant messaging online identity, determining a second state of the status of the instant messaging online identity at the first personal computer and a second state of the status of the instant messaging online identity at the second personal computer, wherein the second state of the status of the instant messaging online identity at the first personal computer is different from the first state of the status of the instant messaging online identity at the first personal computer and the second state of the status of the instant messaging online identity at the second personal computer is the same as the first state of the status of the instant messaging online identity at the second personal computer;
- based on the determined second state of the status of the instant messaging online identity at the first personal computer, determining not to route the second instant message to the first personal computer;
- based on the determined second state of the status of the instant messaging online identity at the second personal computer, determining to route the second instant message to the second personal computer; and
- as a consequence of having determined to route the second instant message to the second personal computer, routing the second instant message to the second personal computer.

2. The method as in claim 1 wherein the first state of the status of the instant messaging online identity at the first personal computer and the second state of the status of the instant messaging online identity at the first personal computer include a user-defined state.

3. The method as in claim 1 wherein the first state of the status of the instant messaging online identity at the first personal computer and the second state of the status of the instant messaging online identity at the first personal computer include an active state.

4. The method as in claim 1 wherein the first state of the status of the instant messaging online identity at the first personal computer and the second state of the status of the instant messaging online identity at the first personal computer include an idle state.

5. The method as in claim 1 wherein the first state of the status of the instant messaging online identity at the first personal computer and the second state of the status of the instant messaging online identity at the first personal computer include a user-set state.

6. The method as in claim 5 wherein the user-set state includes an away state.

7. The method as in claim 1 further comprising, after routing the second instant message to the second personal computer, displaying the second instant message at the second personal computer using the second instant messaging controller computer program.

8. A method for routing instant messages, the method comprising:
receiving, from a first instant messaging controller computer program running on a personal computer, a first request for an instant messaging online identity assigned to a user to be logged on to an instant messaging system through the personal computer, wherein the instant messaging system is configured with at least one processor;

in response to receiving the first request for the instant messaging online identity to be logged on to the instant messaging system through the personal computer, logging the instant messaging online identity on to the instant messaging system through the personal computer such that the instant messaging online identity is enabled to send and receive instant messages using the first instant messaging controller computer program running on the personal computer, wherein the first instant messaging controller computer program monitors a status of the instant messaging online identity at the personal computer while the instant messaging online identity is logged on to the instant messaging system through the personal computer;

while the instant messaging online identity remains logged on to the instant messaging system through the personal computer, receiving, from a second instant messaging controller computer program running on a mobile device, a second request for the same instant messaging online identity to be logged on to the instant messaging system through the mobile device, wherein the second instant messaging controller computer program differs from the first instant messaging controller computer program;

in response to receiving the second request for the instant messaging online identity to be logged on to the instant messaging system through the mobile device, logging the instant messaging online identity on to the instant messaging system through the mobile device such that the instant messaging online identity is enabled to send and receive instant messages using the second instant messaging controller computer program running on the mobile device and such that the instant messaging online identity is logged on to the instant messaging system at both the personal computer and the mobile device concurrently, wherein the second instant messaging controller computer program monitors a status of the instant messaging online identity at the mobile device while the instant messaging online identity is logged on to the instant messaging system through the mobile device;

while the instant messaging online identity remains concurrently logged on to the instant messaging system through both the personal computer and the mobile device, using the at least one processor for:

receiving a first instant message addressed to the instant messaging online identity, in response to receiving the first instant message addressed to the instant messaging online identity, determining a first state of the status of the instant messaging online identity at the personal computer and a first state of the status of the instant messaging online identity at the mobile device, based on the determined first state of the status of the instant messaging online identity at the personal computer and the determined first state of the status of the instant messaging online identity at the mobile device, determining to route the first instant message to both the personal computer and the mobile device, as a consequence of having determined to route the first instant message to both the personal computer and the mobile device, routing the first instant message to both the personal computer and the mobile device;

while the instant messaging online identity remains concurrently logged on to the instant messaging system through both the personal computer and the mobile device and after routing the first instant message to both the personal computer and the mobile device using the at least one processor for:

receiving a second instant message addressed to the instant messaging online identity;

in response to receiving the second instant message addressed to the instant messaging online identity, determining a second state of the status of the instant messaging online identity at the personal computer and a second state of the status of the instant messaging online identity at the mobile device, wherein the second state of the status of the instant messaging online identity at the personal computer is different from the first state of the status of the instant messaging online identity at the personal computer and the second state of the status of the instant messaging online identity at the mobile device is the same as the first state of the status of the instant messaging online identity at the mobile device;

based on the determined second state of the status of the instant messaging online identity at the personal computer, determining not to route the second instant message to the personal computer;

based on the determined second state of the status of the instant messaging online identity at the mobile device, determining to route the second instant message to the mobile device; and as a consequence of having determined to route the second instant message to the mobile device, routing the second instant message to the mobile device.

9. The method as in claim 8 wherein the mobile device includes a cellular phone.

10. The method as in claim 8 wherein the mobile device includes a personal digital assistant.

11. A method for routing instant messages, the method comprising:

receiving, from a first instant messaging controller computer program running on a first mobile device, a first request for an instant messaging online identity assigned to a user to be logged on to an instant messaging system through the first mobile device, wherein the instant messaging system is configured with at least one processor;

in response to receiving the first request for the instant messaging online identity to be logged on to the instant messaging system through the first mobile device, logging the instant messaging online identity on to the instant messaging system through the first mobile device such that the instant messaging online identity is enabled to send and receive instant messages using the first instant messaging controller computer program running on the first mobile device, wherein the first instant messaging controller computer program monitors a status of the instant messaging online identity at the first mobile device while the instant messaging online identity is logged on to the instant messaging system through the first mobile device;

while the instant messaging online identity remains logged on to the instant messaging system through the first mobile device, receiving, from a second instant messaging controller computer program running on a second mobile device, a second request for the same instant messaging online identity to be logged on to the instant messaging system through the second mobile device, wherein the second instant messaging controller computer program differs from the first instant messaging controller computer program and the second mobile device differs from the first mobile device;

in response to receiving the second request for the instant messaging online identity to be logged on to the instant messaging system through the second mobile device, logging the instant messaging online identity on to the instant messaging system through the second mobile device such that the instant messaging online identity is enabled to send and receive instant messages using the second instant messaging controller computer program running on the second mobile device and such that the instant messaging online identity is logged on to the instant messaging system at both the first mobile device and the second mobile device concurrently, wherein the second instant messaging controller computer program monitors a status of the instant messaging online identity at the second mobile device while the instant messaging online identity is logged on to the instant messaging system through the second mobile device;

while the instant messaging online identity remains concurrently logged on to the instant messaging system through both the first mobile device and the second mobile device, using the at least one processor for:
   receiving a first instant message addressed to the instant messaging online identity,
   in response to receiving the first instant message addressed to the instant messaging online identity, determining a first state of the status of the instant messaging online identity at the first mobile device and a first state of the status of the instant messaging online identity at the second mobile device,
   based on the determined first state of the status of the instant messaging online identity at the first mobile device and the determined first state of the status of the instant messaging online identity at the second mobile device, determining to route the first instant message to both the first mobile device and the second mobile device,
   as a consequence of having determined to route the first instant message to both the first mobile device and the second mobile device, routing the first instant message to both the first mobile device and the second mobile device;

while the instant messaging online identity remains concurrently logged on to the instant messaging system through both the first mobile device and the second mobile device and after routing the first instant message to both the first mobile device and the second mobile device, using the at least one processor for:
   receiving a second instant message addressed to the instant messaging online identity;
   in response to receiving the second instant message addressed to the instant messaging online identity, determining a second state of the status of the instant messaging online identity at the first mobile device and a second state of the status of the instant messaging online identity at the second mobile device, wherein the second state of the status of the instant messaging online identity at the first mobile device is different from the first state of the status of the instant messaging online identity at the first mobile device and the second state of the status of the instant messaging online identity at the second mobile device is the same as the first state of the status of the instant messaging online identity at the second mobile device;
   based on the determined second state of the status of the instant messaging online identity at the first mobile device, determining not to route the second instant message to the first mobile device;
   based on the determined second state of the status of the instant messaging online identity at the second mobile device, determining to route the second instant message to the second mobile device; and
   as a consequence of having determined to route the second instant message to the second mobile device, routing the second instant message to the second mobile device.

12. The method as in claim 11 wherein the first and second mobile devices include at least one cellular phone.

13. The method as in claim 11 wherein the first and second mobile devices include at least one personal digital assistant.

14. A tangible machine-accessible storage that when accessed, results in a machine performing operations for routing and displaying instant messages, comprising:
   receiving, from a first instant messaging controller on a first device a first request for an instant messaging online identity assigned to a user to be logged on to an instant messaging system through the first device;
   in response to receiving the first request for the instant messaging online identity to be logged on to the instant messaging system through the first device, logging the instant messaging online identity on to the instant messaging system through the first device such that the instant messaging online identity is enabled to send and receive instant messages using the first instant messaging controller on the first device, wherein the first instant messaging controller monitors a status of the instant messaging online identity at the first device while the instant messaging online identity is logged on to the instant messaging system through the first device;
   while the instant messaging online identity remains logged on to the instant messaging system through the first device, receiving, from a second instant messaging controller on a second device, a second request for the same instant messaging online identity to be logged on to the instant messaging system through the second device, wherein the second instant messaging controller differs from the first instant messaging controller and the second device differs from the first device;
   in response to receiving the second request for the instant messaging online identity to be logged on to the instant messaging system through the second device, logging the instant messaging online identity on to the instant messaging system through the second device such that the instant messaging online identity is enabled to send and receive instant messages using the second instant messaging controller running on the second device and such that the instant messaging online identity is logged on to the instant messaging system at both the first device and the second device concurrently, wherein the second instant messaging controller monitors a status of the instant messaging online identity at the second device while the instant messaging online identity is logged on to the instant messaging system through the second device;
   while the instant messaging online identity remains concurrently logged on to the instant messaging system through both the first device and the second device:
      receiving a first instant message addressed to the instant messaging online identity,
      in response to receiving the first instant message addressed to the instant messaging online identity, determining a first state of the status of the instant messaging online identity at the first device and a first state of the status of the instant messaging online identity at the second device,
      based on the determined first state of the status of the instant messaging online identity at the first device and the determined first state of the status of the instant messaging online identity at the second device, determining to route the first instant message to both the first device and the second device, as a consequence of having determined to route the first instant message to both the first device and the second device, routing the first instant message to both the first device and the second device;

while the instant messaging online identity remains concurrently logged on to the instant messaging system through both the first device and the second device and after routing the first instant message to both the first device and the second device:

receiving a second instant message addressed to the instant messaging online identity;

in response to receiving the second instant message addressed to the instant messaging online identity, determining a second state of the status of the instant messaging online identity at the first device and a second state of the status of the instant messaging online identity at the second device, wherein the second state of the status of the instant messaging online identity at the first device is different from the first state of the status of the instant messaging online identity at the first device and the second state of the status of the instant messaging online identity at the second device is the same as the first state of the status of the instant messaging online identity at the second device;

based on the determined second state of the status of the instant messaging online identity at the first device, determining not to route the second instant message to the first device;

based on the determined second state of the status of the instant messaging online identity at the second device, determining to route the second instant message to the second device; and as a consequence of having determined to route the second instant message to the second device, routing the second instant message to the second device.

15. The machine-accessible storage of claim 14 wherein the first state of the status of the instant messaging online identity at the first device and the second state of the status of the instant messaging online identity at the first device include a user-defined state.

16. The machine-accessible storage of claim 14 wherein the first state of the status of the instant messaging online identity at the first device and the second state of the status of the instant messaging online identity at the first device include an active state.

17. The machine-accessible storage of claim 14 wherein the first state of the status of the instant messaging online identity at the first device and the second state of the status of the instant messaging online identity at the first device include an idle state.

18. The machine-accessible storage of claim 14 wherein the first state of the status of the instant messaging online identity at the first device and the second state of the status of the instant messaging online identity at the first device include a user-set state.

19. The machine-accessible storage of claim 18 wherein the user-set state includes an away state.

20. The machine-accessible storage of claim 14, wherein accessing the machine accessible medium further results in displaying, after routing the second instant message to the second device, the instant message at the second device using the second instant messaging controller.

21. The machine-accessible storage of claim 14 wherein:
the first device is a personal computer;
the first instant messaging controller is a first computer program running on the personal computer;
the second device is a mobile device; and
the second instant messaging controller is a second computer program running on the mobile device.

22. The machine-accessible storage of claim 21 wherein the mobile device includes a cellular phone.

23. The machine-accessible storage of claim 21 wherein the mobile device includes a personal digital assistant.

24. The machine-accessible storage of claim 14 wherein the first and second devices are different mobile devices and the first instant messaging controller and the second instant messaging controller are computer programs running on the different mobile devices.

25. The machine-accessible storage of claim 24 wherein the first and second mobile devices include at least one cellular phone.

26. The machine-accessible storage of claim 24 wherein the first and second mobile devices include at least one personal digital assistant.

27. The machine-accessible storage of claim 14 wherein the first and second devices are different personal computers and the first instant messaging controller and the second instant messaging controller are computer programs running on the different personal computers.

28. The machine-accessible storage of claim 14 wherein:
the machine includes a computer that performs the operations, and
the machine-accessible medium includes a computer-readable medium having stored thereon one or more sequences of instructions for causing the computer to perform the operations.

29. The method of claim 1 wherein routing the second instant message to the second personal computer includes routing the second instant message to the second personal computer to the exclusion of the first personal computer.

30. The method of claim 8 wherein routing the second instant message to the mobile device includes routing the second instant message to the mobile device to the exclusion of the personal computer.

31. The method of claim 11 wherein routing the second instant message to the second mobile device includes routing the second instant message to the second mobile device to the exclusion of the first mobile device.

32. The machine-accessible storage medium of claim 14 wherein routing the second instant message to the second device includes routing the second instant message to the second device to the exclusion of the first device.

33. The method as in claim 8 further comprising: while the instant messaging online identity remains concurrently logged on to the instant messaging system through both the personal computer and the mobile device and after routing the first instant message to both the personal computer and the mobile device:

receiving a third instant message addressed to the instant messaging online identity;

in response to receiving the third instant message addressed to the instant messaging online identity, determining a third state of the status of the instant messaging online identity at the personal computer and a third state of the status of the instant messaging online identity at the mobile device, wherein the third state of the status of the instant messaging online identity at the personal computer is the same as the first state of the status of the instant messaging online identity at the personal computer and the third state of the status of the instant messaging online identity at the mobile device is different from the first and second states of the status of the instant messaging online identity at the mobile device;

based on the determined third state of the status of the instant messaging online identity at the mobile device, determining not to route the third instant message to the mobile device;

based on the determined third state of the status of the instant messaging online identity at the personal computer, determining to route the third instant message to the personal computer; and as a consequence of having determined to route the third instant message to the personal computer, routing the third instant message to the personal computer.

34. The method of claim 1 wherein the instant messaging online identity comprises an instant messaging account.

35. The method of claim 1 wherein the instant messaging online identity comprises a screen name.

36. The method of claim 1 wherein the instant messaging online identity comprises a set of characters or symbols.

37. The method of claim 8 wherein the instant messaging online identity comprises an instant messaging account.

38. The method of claim 8 wherein the instant messaging online identity comprises a screen name.

39. The method of claim 8 wherein the instant messaging online identity comprises a set of characters or symbols.

40. The method of claim 11 wherein the instant messaging online identity comprises an instant messaging account.

41. The method of claim 11 wherein the instant messaging online identity comprises a screen name.

42. The method of claim 11 wherein the instant messaging online identity comprises a set of characters or symbols.

43. The machine-accessible storage of claim 14 wherein the instant messaging online identity comprises an instant messaging account.

44. The machine-accessible storage of claim 14 wherein the instant messaging online identity comprises a screen name.

45. The machine-accessible storage of claim 14 wherein the instant messaging online identity comprises a set of characters or symbols.

\* \* \* \* \*